(12) United States Patent
Kullen (10) Patent No.: US 9,664,285 B2
(45) Date of Patent: May 30, 2017

(54) SHEET-METAL FLAT SEAL LAYER AND METHOD FOR THE PRODUCTION THEREOF

(71) Applicant: ElringKlinger AG, Dettingen (DE)

(72) Inventor: Wilhelm Kullen, Huelben (DE)

(73) Assignee: ElringKlinger AG, Dettingen (DE)

( * ) Notice: Subject to any disclaimer, the term of this patent is extended or adjusted under 35 U.S.C. 154(b) by 0 days.

(21) Appl. No.: 14/804,602

(22) Filed: Jul. 21, 2015

(65) Prior Publication Data

US 2015/0323075 A1    Nov. 12, 2015

Related U.S. Application Data

(63) Continuation of application No. PCT/EP2014/050362, filed on Jan. 10, 2014.

(30) Foreign Application Priority Data

Jan. 22, 2013  (DE) .......................... 10 2013 100 612

(51) Int. Cl.
*F16J 15/08* (2006.01)
*B21D 35/00* (2006.01)
(Continued)

(52) U.S. Cl.
CPC ........ *F16J 15/0818* (2013.01); *B21D 35/001* (2013.01); *F01N 13/1827* (2013.01);
(Continued)

(58) Field of Classification Search
CPC .. F16J 15/0818; F16J 15/0868; F16J 15/0887; F16J 2015/0868; F16J 2015/00; F16J 2015/002
See application file for complete search history.

(56) References Cited

U.S. PATENT DOCUMENTS 1,839,336 A * 1/1932 Oven ...................... F16J 15/123
277/598
1,913,736 A * 6/1933 Victor ..................... F16J 15/123
277/591
(Continued)

FOREIGN PATENT DOCUMENTS

| DE | 101 03 885 | 8/2002 |
| FR | 2 886 364 | 12/2006 |
| JP | 2004-360801 | 12/2004 |

*Primary Examiner* — Kristina Fulton
*Assistant Examiner* — L. Susmitha Koneru
(74) *Attorney, Agent, or Firm* — Womble Carlyle Sandridge & Rice LLP (57) ABSTRACT

A flat seal having at least one single-piece sheet-metal seal layer is provided, which has at least one first layer region provided with at least one medium through opening and, outside the first layer region, at least one second layer region and, with the flat seal installation-ready, has a pre-determined outer contour, wherein the flat seal for the medium through opening has a medium-sealing device. In order to reduce the material requirement for manufacturing the seal layer, the seal layer is configured so that at least one sub-region of the second layer lying outside the medium-sealing device region of the seal layer is formed by a region of the sheet-metal layer that is stretched in the layer plane to achieve the pre-determined outer contour.

17 Claims, 6 Drawing Sheets

(51) Int. Cl.
*F16J 15/02* (2006.01)
*F16J 15/06* (2006.01)
*F01N 13/18* (2010.01)

(52) U.S. Cl.
CPC .......... *F16J 15/024* (2013.01); *F16J 15/064* (2013.01); *F16J 2015/085* (2013.01); *F16J 2015/0868* (2013.01); *Y10T 428/12229* (2015.01)

(56) References Cited

U.S. PATENT DOCUMENTS

| | | |
|---|---|---|
| 4,728,110 A | 3/1988 | Nakasone |
| 4,813,687 A * | 3/1989 | Nakayama ............ F16J 15/122 277/511 |
| 5,022,661 A | 6/1991 | Nakasone |
| 5,590,888 A | 1/1997 | Brummer et al. |
| 6,189,895 B1 | 2/2001 | Yamada |
| 7,926,852 B2 * | 4/2011 | Geminn ................ F01N 13/10 285/124.1 |
| 2009/0072493 A1 * | 3/2009 | Duckek ............... F16J 15/0818 277/593 |

* cited by examiner

SHEET-METAL FLAT SEAL LAYER AND METHOD FOR THE PRODUCTION THEREOF

CROSS-REFERENCE TO RELATED APPLICATIONS

The present application is a continuation of international application number PCT/EP2014/050362, filed on Jan. 10, 2014, which claims priority to German patent application number 10 2013 100 612.4, filed on Jan. 22, 2013, the entire specification of both being incorporated herein by reference.

BACKGROUND OF THE INVENTION

The invention relates to a sheet-metal flat seal layer and a single-layer or multiple-layer flat seal which has a sheet-metal layer of this type, a blank of a sheet-metal layer of this type and a method for the production of a flat seal layer of this type.

Metallic flat seals often consist of a single-piece sheet-metal layer or a plurality of substantially congruent sheet-metal layers or one sheet-metal layer functioning as a carrier layer on which sheet-metal coatings are arranged on one or both sides. Typically, the one sheet-metal layer or at least one of the sheet-metal layers extends over the whole so-called sealing gap to be sealed by the flat seal between two components connected to one another.

In particular, the invention relates to metallic flat seals of the aforementioned type with one or more medium through openings for gases and/or liquids, wherein said flat seals have medium-sealing devices associated with the medium through openings—one such medium-sealing device can have, for example, the form of a bead which encloses a medium through opening and which was impressed into a sheet-metal layer of a flat seal of this type.

Particularly for large metallic flat seals which are subject to relatively high and high operating temperatures, such as elongate exhaust manifold seals, intake manifold seals and cylinder head seals for multiple-cylinder internal combustion engines, the material costs are usually a decisive factor since expensive spring steels and/or steels able to withstand high temperatures must be used for these flat seals and, in this regard, it should be noted that the material costs are high even if steels initially not having resilient properties are processed and are then given resilient properties by means of a heat treatment.

SUMMARY OF THE INVENTION

One of the aspects of the present invention arose as part of the cost reduction striven for by all seal manufacturers and is revealed by the following. Every metallic flat seal has at least one region performing a sealing function and regions without sealing functions; seal regions with sealing functions are, in particular, those which surround the through openings of the seals that are to be sealed and, for example, have beads impressed in sheet-metal layers; however, a sheet-metal ring laid onto a sheet-metal layer or the like can also take the place of such a sealing bead. On the other hand, seal regions with no sealing functions for fulfilling the task assigned to a flat seal are at least almost irrelevant, so that openings and/or cut-outs can be stamped out from a sheet-metal layer of a flat seal in such regions and the stamping waste arising therefrom can be recycled, although this involves not insubstantial costs. Therefore, it is proposed that in the region or in a plurality of regions of a sheet-metal flat seal layer which has or have no sealing function, the strength of the sheet-metal layer should be reduced relative to the strength of a or the region adjacent to the relevant region or regions (for example, by means of local or partial reduction of the cross-section or local narrowing of the sheet-metal layer) so that this region or these regions can be at least locally deformed by means of a tensile loading of the sheet-metal layer in at least one direction lying in the layer plane and thereby can be stretched, drawn-out or elongated in the layer plane in at least one direction. For manufacturing a single-piece sheet-metal flat seal layer, it is beneficial to make from a metal sheet a seal layer blank with a preliminary outer contour which is smaller in at least one direction lying in the layer plane than the final contour of the flat seal layer to be manufactured, and then to deform the weakened layer region or the weakened layer regions by means of a tensile loading and thereby to stretch it or them in the layer plane so that the blank with the preliminary outer contour is thereby transformed at least substantially into the flat seal layer with its pre-determined final outer contour.

During stretching of the blank, the weakened layer region is plastically deformed, in general, in at least one or more locations; in the case of a multiple-layered flat seal, however, a procedure is also possible in which the sheet metal of the blank for the flat seal layer is stretched only in the elastic region of the sheet metal and the seal layer resulting therefrom is then fixed, specifically by connecting (for example, by means of spot welding) to another flat seal layer made of a less costly material.

As a result, significantly less material is needed for manufacturing the flat seal layer with a pre-defined final outer contour, specifically only the metal sheet required for manufacturing the smaller blank. In particular, a flat seal layer can be made so that during the manufacturing of the installation-ready flat seal layer or flat seal with its pre-determined final outer contour, no further appreciable stamping waste is generated, specifically in addition to the stamping waste which is inevitable during the manufacturing of the blank and the openings such as medium openings and screw holes.

The installation-ready seal layer or flat seal should be understood as the seal layer or flat seal in the form in which it is provided for installation.

Starting from a method for manufacturing a single-piece sheet-metal flat seal layer which, in the installation-ready flat seal, has a pre-determined final outer contour, at least one first layer region provided with at least one medium through opening and, seen in a plan view of the seal layer, outside the first layer region, has at least one second layer region and defines a layer plane, an embodiment of the present invention can be realized in that, from a metal sheet, a seal layer blank with a preliminary outer contour is cut out, which is smaller in at least a first direction lying in the layer plane than the final outer contour of the flat seal layer, and in that at least one sub-region of the second layer region is stretched by a tensile loading of the blank taking place in the first direction so that the preliminary outer contour is thereby transformed at least substantially into the final outer contour of the flat seal layer.

Preferred embodiments of the method according to the invention by means of which the tensile forces required for stretching the blank can be minimized are distinguished in that in the sub-region of the second layer region, a plurality of perforations are created which, seen in a plan view of the blank, are configured, oriented and arranged so that, by means of the tensile loading of the blank, the perforations are expandable in the first direction and in that the sub-region is stretched by means of the tensile loading and is thereby deformed so that in this way the perforations are expanded in the first direction and the preliminary outer contour is transformed at least substantially into the final outer contour. The word "perforations" is intended to denote that they extend through the sheet-metal layer, that is, they extend over the whole thickness of the sheet-metal layer.

In preferred embodiments, a single-piece flat seal layer is intended to mean a sheet-metal layer which consists of a single piece of sheet metal, that is, not a plurality of sheet-metal pieces which are connected to one another, for example, by weld seams.

Furthermore, in preferred embodiments the pre-determined final outer contour of the flat seal layer should be understood to mean its outer contour with the flat seal not yet installed and not loaded.

Where it is stated above that the preliminary outer contour is at least substantially transformed by the stretching of the blank into the final outer contour of the flat seal layer, for preferred embodiments it is thereby intended to express that the outer contour of the stretched blank matches the final outer contour only in the first direction, that is, only in the direction of the applied tensile loading, which means it should not be precluded that the stretched blank might possibly be further processed again, for example, by stamping, in order to achieve the desired final contours of the installation-ready flat seal layer all over. The reasons for a further processing of this type could be, for example, the following: during stretching of the at least one sub-region of the second layer region, the width of the second layer region measured transversely to the direction of the tensile loading can become at least locally reduced and since the blank is possibly also deformed outside the second layer region under the influence of the tensile loading, it can be advisable only after the stretching of the blank to create one or more medium through openings and other openings and holes in the seal layer, in particular to stamp said openings therefrom.

For stretching the sub-region of the blank which is weakened and, in particular, provided with perforations, outer edge regions of the blank which approximately oppose one another in the direction of the tensile loading and/or regions of the blank directly adjacent to the sub-region and/or a blank outer edge region and a blank region directly adjacent to the sub-region can be clamped and the tensile forces can be introduced into the sheet metal of the blank via these clamped regions.

It should also be noted, however, that due to the weakening of the sheet metal in the sub-region to be stretched, the tensile forces required for the stretching of this sub-region can be kept so small that they do not lead to a deformation of other regions of the blank, particularly not to a change of the shape and/or the position of medium or other through openings which have been introduced into the blank before the stretching of the sub-region.

During the stretching of the sub-region weakened by perforations, the sheet-metal regions adjacent to the perforations can have the tendency to become inclined to the layer plane and then to protrude out of the layer plane. In this case, the stretched sub-region can be flattened again by pressing.

It follows from the above that the invention also relates to a blank (often also referred to as a plate) of a single-piece sheet-metal layer of a flat seal, the sheet-metal layer of which in an installation-ready (i.e., not yet pressed) flat seal has a pre-determined outer contour, wherein the blank has at least one first layer region provided or still to be provided with at least one medium through opening and, seen in a plan view of the blank, outside the first layer region has at least one second layer region and a preliminary outer contour, which is smaller in a direction leading from the first to the second layer region than the pre-determined outer contour; in preferred embodiments, a blank of this type is distinguished in that the sheet-metal layer consists of a metallic material which is deformable in the layer plane and in at least one sub-region of the second layer region is configured so that this sub-region is stretchable by a tensile loading in the layer plane and in the aforementioned first direction and thereby the preliminary outer contour of the blank is enlargeable in the first direction as far as the pre-determined outer contour.

So that the blank can be adequately stretched with the smallest possible tensile forces, embodiments of the blank are recommended in which the sub-region of the second layer region has a plurality of perforations which, seen in a plan view of the sheet-metal layer, are configured, oriented and arranged so that the perforations can be expanded by means of a tensile loading of the blank in the layer plane and in a direction leading from the first to the second layer region and thereby the preliminary outer contour of the blank are enlargeable in the direction of the tensile loading by a pre-determinable quantity.

In the case of the blank, also, the stipulation that the second layer region should lie outside the first layer region is intended to mean that the first and second layer region, as seen in a plan view of the blank, do not overlap.

If a sheet-metal layer with spring steel properties is to be manufactured from the blank, it can be advantageous for the manufacturing of the blank to use a still relatively easily deformable sheet metal made of a steel which can be given resilient properties by means of a heat treatment and to subject the blank to a suitable heat treatment after stretching its at least one sub-region.

In preferred embodiments of the blank according to the invention, at least a plurality of the perforations are formed by linear stamping cuts and/or at least one of the perforations is formed by a cut-out extending through the sheet-metal layer.

So that the at least one sub-region of the blank to be stretched can be stretched to a considerable extent without excessive tensile forces, preferred embodiments of the blank according to the invention are recommended in which the perforations are configured elongate and extend essentially transversely to the direction of the pre-determined enlargement of the outer contour of the blank, wherein it is particularly advantageous if the blank has a plurality of groups of elongate perforations and each group has a plurality of the perforations arranged one behind the other in the longitudinal direction of the perforations, wherein the perforations of each group are offset in the longitudinal direction of the perforations relative to the perforations of an adjacent group.

Finally, the invention relates to a flat seal having at least one single-piece sheet-metal seal layer defining a layer plane, which has at least one first layer region provided with at least one medium through opening and, seen in a plan view of the sheet-metal layer, outside the first layer region, at least one second layer region and with the flat seal installation-ready, has a pre-determined outer contour, wherein the flat seal for the medium through opening preferably has a medium-sealing device which is associated with said medium through opening and which can be provided in or on the aforementioned single-piece sheet-metal layer and/or in or on another flat seal layer; the invention therefore relates both to single-layer and multiple-layer flat seals.

In order to reduce the sheet metal requirement and to minimize the creation of stamping waste in the manufacturing of such a single-piece sheet-metal layer, the aforementioned sheet-metal layer for a flat seal is preferably designed so that, at least one sub-region lying, when seen in a plan view of the sheet-metal layer, outside the optionally-provided medium-sealing device ("outside" is here intended only to mean that in a plan view, the medium-sealing device and the sub-region do not overlap one another) of the second layer region of the installation-ready flat seal is formed by a region of the sheet-metal layer that is stretched in the layer plane to achieve the pre-determined outer contour.

It is also the case for the seal layer according to the invention that in preferred embodiments, the stretched sub-region is formed at least locally by plastically deformed zones of the metal sheet in order thus to obtain a seal layer which retains its shape without further measures.

In order to achieve the stretching of at least one sub-region of the further layer region with the smallest possible tensile loading, embodiments are recommended in which the stretched sub-region, seen in a plan view of the seal layer, has at least one cut-out between sheet-metal webs extending inclined to one another. Since the aforementioned sub-region is stretched during the manufacturing of the finished seal layer, no, or at most minimal, stamping waste arises during production of the final cut-out or cut-outs, since in the prior stage of the seal layer before the stretching, the perforations provided in the sheet metal and leading to the final cut-outs are much smaller than in the final seal layer and possibly have the form of very narrow slits.

Where, above, the installation-ready flat seal was being discussed, hereinafter, this should be understood as the not yet loaded and not yet installed flat seal.

The sheet-metal webs can extend at an angle of greater than 0° and less than 180° to one another.

The cut-outs should be understood as such which preferably extend through the entire thickness of the sheet-metal layer.

Lastly, the sheet-metal layer should be single-piece in the sense that it also does not consist of a plurality of sheet-metal pieces joined to one another, for example, by weld seams.

The fact that the sub-region provided with the cut-outs is formed from a stretched and thereby plastically deformed sheet-metal region can be verified from the finished seal layer, for example, based on the structure of the stretched metallic region recognizable in a micrograph or by determining the internal tensions present in this region, and a sealing layer according to the invention may be distinguished by this stretched sheet-metal region, in relation also to a sheet-metal layer of known metallic flat seals as disclosed in U.S. Pat. No. 6,189,895 B1.

This document specifically concerns metallic flat seals which are to be arranged between a cylinder head and an exhaust manifold of an internal combustion engine (see, e.g., the third paragraph of column 1) and a plurality of first seal regions arranged one behind the other, each having an exhaust through opening and second seal regions between these first seal regions, formed by a single-piece sheet-metal layer extending over the entire flat seal and are designed so that they elongate reversibly in the longitudinal direction of the flat seal during engine operation and can be shortened again in order to take account of the circumstance that the exhaust manifold expands in the longitudinal direction of the flat seal when the engine is in operation and its power output is increased, but cools again and shrinks in the seal longitudinal direction when the engine is operated at lower power output or during idling or is switched off. The exhaust manifold seals disclosed in FIGS. 2 and 6 to 12 of U.S. Pat. No. 6,189,895 B1 each have a seal layer with second seal regions lying between the aforementioned first seal regions and having stamped-out cut-outs which enable elongation and shrinkage of the second seal regions in the seal longitudinal direction without the seal being damaged or even destroyed. It is unambiguously clear from U.S. Pat. No. 6,189,895 B1, however, that during the manufacturing of these known flat seals, the seal layer which has the aforementioned second seal regions is stamped out with its final shape and thus with the cut-outs in their final form from the sheet metal used for this seal layer. As a consequence, not all the stamping waste which arises during stamping out of the cut-outs can be prevented; a comparison of the flat seal shown, for example, in FIG. 2 of U.S. Pat. No. 6,189,895 B1 with a corresponding flat seal according to the present invention shows, however, that for the manufacturing of the seal layer of the known flat seal provided with the cut-outs, a much longer sheet-metal piece is needed than for the manufacturing of the seal layer according to the present invention and that between the first layer regions of the known flat seal provided with the exhaust through openings, significantly more stamping waste arises than in the manufacturing of a comparable seal layer according to the invention.

However, it should also be mentioned that a flat seal constructed according to the present invention can adapt just as well to length changes caused by temperature variations, in the case of an installed flat seal, of the components accommodating said flat seal between them as the flat seals known from U.S. Pat. No. 6,189,895 B1.

Purely for the sake of completeness, reference is further made regarding the prior art, to FIGS. 9 to 11 of U.S. Pat. No. 4,728,110 A and to FIGS. 10 to 13 of U.S. Pat. No. 5,022,661 A which also all disclose metallic exhaust manifold seals which have second seal regions between first seal regions provided with exhaust through openings and which expand reversibly in the seal longitudinal direction during engine operation and shrink again, although these known seals also do not have the specific advantages of a flat seal according to the present invention.

An intake manifold seal which has a certain similarity to the exhaust manifold seals of FIGS. 6 and 12 of U.S. Pat. No. 6,189,895 B1 is disclosed by U.S. Pat. No. 5,590,888 A, although this intake manifold seal is a purely elastomer seal, which means that it is made from an elastomer material.

If a flat seal or a seal layer according to the invention has a plurality of first layer regions and if at least two mutually adjacent first layer regions are connected to one another by means of at least one second layer region, a design in which the sheet-metal webs extend inclined to the direction of a straight line which connects centers of medium through openings that adjoin the second layer region to one another is preferable, since in an embodiment of this type, the sheet-metal region serving to form the second layer region can be stretched with particularly small tensile forces.

In a flat seal or seal layer according to the invention, the second layer region can also form an outwardly extending projection of the flat seal or seal layer and said projection serves herein to minimize the tensile forces required for stretching the sheet-metal layer if the sheet-metal webs extend inclined to the direction in which the projection extends essentially beyond the remaining sheet-metal layer.

With regard both to minimizing the tensile forces required for stretching the sheet-metal layer and also for achieving the greatest possible effect through the stretching, it is particularly advantageous if the stretched sub-region of the seal layer is formed by an expanded metal region of the sheet-metal layer.

BRIEF DESCRIPTION OF THE DRAWINGS

Further features, advantages and details of the invention are disclosed in the attached drawings and the following description of particularly preferable embodiments of the invention; and in the drawings.

DETAILED DESCRIPTION OF THE INVENTION

Figure 1:
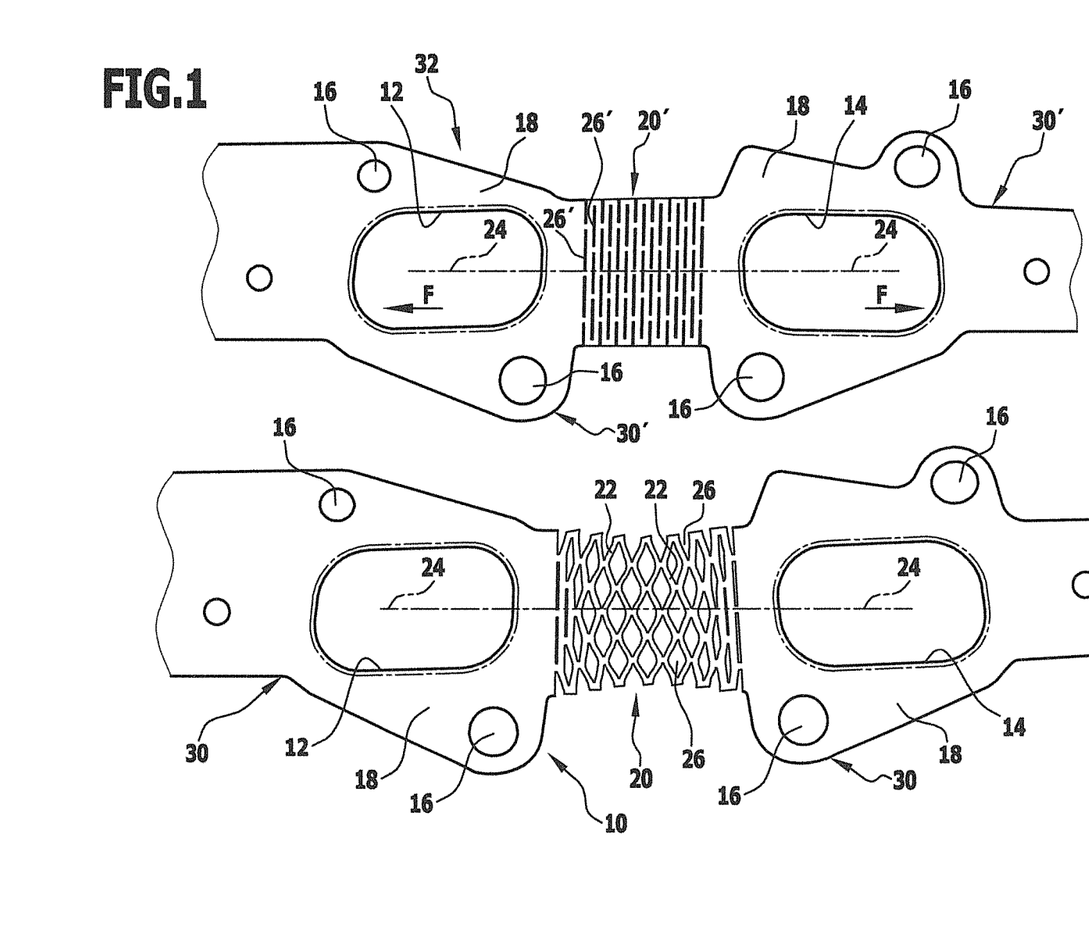
FIG. 1 shows part of an inventive flat seal layer of a manifold seal wherein, in FIG. 1 at the bottom, the flat seal layer is shown in the installation-ready state and at the top, a blank for this flat seal layer before stretching of the blank and the seal is intended as an exhaust manifold seal or an intake manifold seal for an internal combustion engine.

FIG. 1 shows, at the bottom, a part of a sheet-metal flat seal layer 10 which can be one seal layer of a multiple-layer flat seal or the one layer of a single-layer seal, specifically in the case of the embodiment shown, a manifold seal, in particular an exhaust manifold seal for installation between a cylinder head and an exhaust manifold of a multiple-cylinder internal combustion engine.

The seal layer 10 has a plurality of gas through openings, of which FIG. 1 shows only the two gas through openings 12 and 14, but otherwise some holes, for example, a plurality of screw holes 16 for penetration by mounting screws with the aid of which the flat seal is clamped between components, in the present case between a cylinder head and an exhaust manifold.

The part of the single-piece seal layer 10 shown in FIG. 1 at the bottom comprises two first layer regions 18 with the gas through openings 12, 14 and a second layer region 20 which is arranged between these first layer regions and connects them to one another and which is configured in the manner of an expanded metal and has sheet-metal webs 22 which extend inclined to one another and which also extend inclined to a line 24 which connects centers of the gas through openings 12 and 14 to one another and, in the embodiment shown of the seal layer according to the invention, extends in the longitudinal direction thereof.

Between the sheet-metal webs 22, the second layer region 20 has a plurality of cut-outs 26, since the layer region 20 is intended to be a zone of the seal layer 10 which has no sealing function.

The seal layer 10 is provided, indicated dot-dashed in FIG. 1 only, with gas sealing devices, in particular with sealing beads impressed into the sheet-metal layer, which enclosingly surround each of the gas through openings 12, 14.

The installation-ready seal layer 10 shown in the bottom part of FIG. 1 has a final outer contour 30 which differs from the preliminary outer contour 30' of a blank 32 shown in the top part of FIG. 1, from which the seal layer 10 is manufactured, specifically in the embodiments of the finished seal layer 10 and of the blank 32 shown in FIG. 1, basically only in that the outer contour 30 of the seal layer 10 is larger in the direction of the line 24 than the outer contour 30' of the blank 32.

The top part of FIG. 1 shows only a portion of the blank 32 stamped out of a metal sheet, wherein this portion of the blank corresponds to the portion of the finished seal layer 10 shown in the bottom part of FIG. 1, so that in the top part of FIG. 1, as far as possible, the same reference signs have been used as in the bottom part of FIG. 1, and according to the invention, all the regions of the blank 32 with the exception of a (central) second length region 20' are configured congruent with the corresponding regions of the finished seal layer 10, so that the outer contour 30' of the blank 32 differs from the outer contour 30 of the finished seal layer 10 only at the location of the second layer region 20', specifically basically only in the length of the second layer region 20' measured in the direction of the line 24, which is smaller than the length of the second layer region 20 of the finished seal layer 10. In particular, there exists identity between the finished seal layer 10 and the blank 32 with regard to the size and form of the gas through openings 12, 14 and the screw holes 16, as well as the positions of the gas through openings and the screw holes relative to one another and to the outer contour 30 or the outer contour 30'.

According to a preferred embodiment of the invention, on stamping out the blank 32, in its second layer region 20', a plurality of stamping slits 26' are created which preferably have the form of straight lines and extend, in particular, perpendicularly to the line 24, but could also form a small acute angle. In the embodiment shown, the stamping cuts 26' are arranged in a plurality of groups oriented perpendicularly to the line 24, wherein the stamping cuts of each group are offset relative to the stamping cuts of an adjacent group in the longitudinal direction of the stamping cuts.

For manufacturing the finished seal layer 10 from the blank 32, said blank is subjected to a tensile loading in the direction of the line 24, specifically a tensile loading of a size that is just sufficient to expand the perforations formed by the stamping cuts 26' so that the cut-outs 26 of the finished seal layer 10 are formed—the forces creating this tension are indicated in the upper part of FIG. 1 by the two arrows F; in order to introduce this tensile loading into the sheet-metal layer forming the blank 32, the longitudinal end regions of the blank 32 (not shown in FIG. 1) can be clamped and pulled apart from one another in the direction of the line 24, although there are several possible alternatives, for example, an alternative in which the first layer regions 18 of the blank 32 are clamped at both sides of the second layer region 20' and are pulled apart from one another in the direction of the line 24.

When stretching in the direction of the line 24 takes place for manufacturing the finished seal layer 10 of the second layer region 20' of the blank 32, the metal of the sheet metal forming the blank 32 is at least substantially only permanently, i.e., plastically, deformed at the ends of the sheet-metal webs 22.

However, if the second layer region 20' of the blank 32 is stretched by such a tensile loading in the direction of the line 24 and is transformed into the second layer region 20 of the seal layer 10, sheet-metal webs 22 which are twisted about their longitudinal axes and therefore project out of the layer plane defined by the seal layer 10 can result; it may then be suitable to press the stretched layer region flat, so that a planar second layer region 20 of the finished seal layer 10 results.

Further embodiments of the invention will now be described in greater detail by reference to FIGS. 2 to 7.

Figure 2:
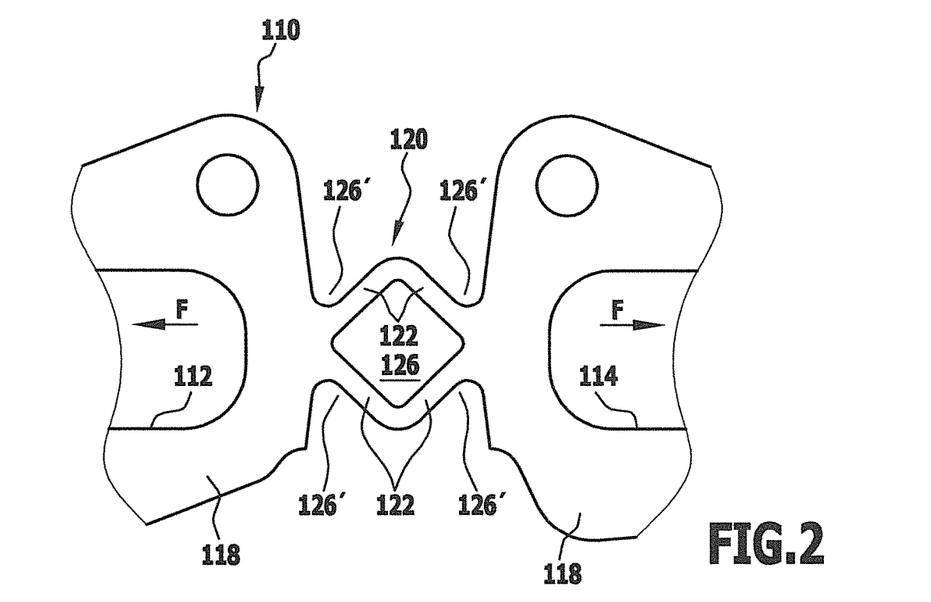
FIGS. 2 and 3 show, respectively, plan views of a part of a second and third embodiment of a seal layer according to the invention.
Figure 3:
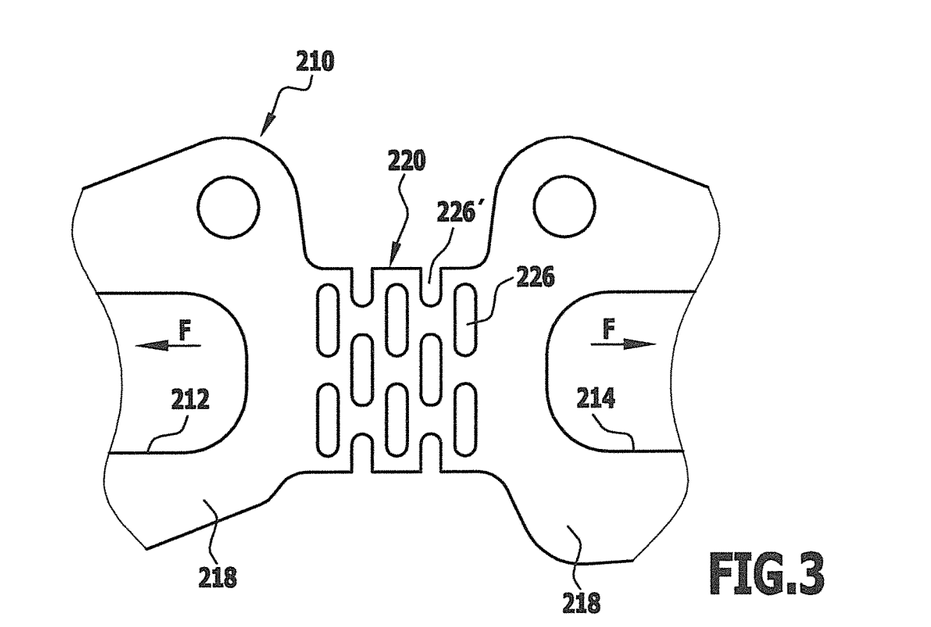

FIGS. 2 and 3 show a portion, respectively, of a second and a third embodiment of a flat seal layer 110 or 210 according to the invention, of which each is configured similarly to the flat seal layer 10 shown in the bottom part of FIG. 1, except for their second layer region 120 or 220. In FIGS. 2 and 3, the first layer regions are identified as 118 or 218 and the gas through openings are identified as 112 and 114 or 212 and 214.

In the embodiment according to FIG. 2, the second layer region 120 has sheet-metal webs 122 and cut-outs 126, 126' and has a diamond-shaped form with a central opening in the form of the cut-out 126. It is clear from the above description of FIG. 1 that a blank used for manufacturing the flat seal layer 110 shown in FIG. 2 has a second layer region, lying between the two first layer regions 118, which has stamping cuts which lead to the cut-outs 126 and 126' during stretching of this second layer region in the direction of the two arrows F shown in FIG. 2.

In the embodiment according to FIG. 3, the second layer region 220 has elongate cut-outs 226 and 226' which have approximately the form of a flat oval or part of a flat oval and result from stretching a blank in the direction of the arrows F, said blank having cut-outs in its second layer region similar to the stamping cuts 26' of the blank 32 shown in FIG. 1.

Figure 4:
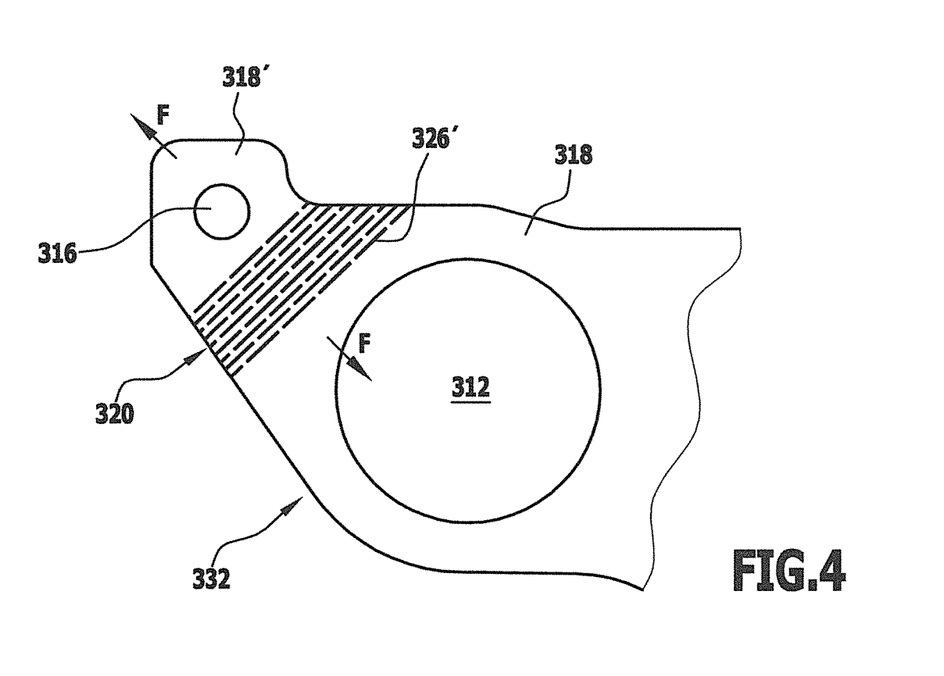
FIG. 4 shows a plan view of a part of a blank for a fourth embodiment of a seal layer according to the invention, specifically before stretching of the blank.

FIG. 4 shows part of a blank 332 for manufacturing a flat seal layer according to an embodiment of the invention; the portion of this blank shown has a medium through opening 312 in a first layer region 318 and a screw hole 316 in a further first layer region 318' and has a second layer region 320 between these two first layer regions 318, 318', which has been provided with stamping cuts 326'. For manufacturing a finished flat seal layer, the blank 332 is subjected to a tensile loading created by tensile forces corresponding to the two arrows F shown in FIG. 4, so that cut-outs similar to the cut-outs 26 in the seal layer 10 shown in FIG. 1 are formed from the stamping cuts 326'.

Figure 5:
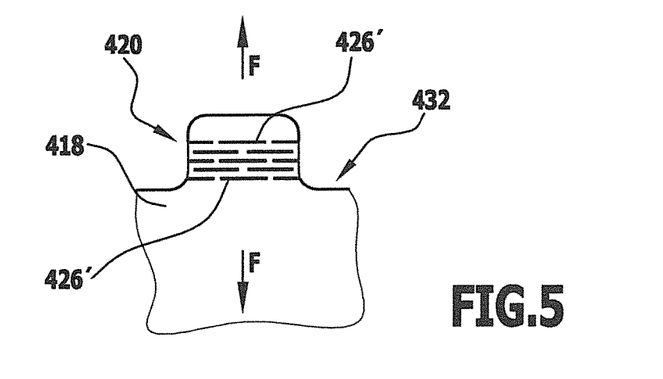
FIG. 5 shows a plan view of a small edge region of a blank for a fifth embodiment of a seal layer according to the invention, again before stretching of the blank.

FIG. 5 shows a small outer edge region of a blank 432, which has a first layer region 418 and, in the outer edge region shown thereof, a second layer region 420 configured as a projection, which is provided with stamping cuts 426'. If the outer edge region of the blank 432 shown in FIG. 5 is subjected to a tensile loading according to the two arrows F shown in FIG. 5, that is, if the second layer region 420 configured as a projection according to FIG. 5 is stretched upwardly, the stamping cuts 426' are expanded to cut-outs similarly to the cut-outs 26 shown in FIG. 1 and the second layer region 420 configured as a projection according to FIG. 5 is elongated upwardly.

FIGS. 4 and 5 make clear that the blank 332 or 432 can be stamped from a sheet-metal piece which is smaller than a sheet-metal piece required for the stamping out of the finished flat seal layer, since in the blank 332, the first layer region 318' and in the blank 432, the second layer region 420 projects less far beyond the adjacent blank regions than is the case in the finished flat seal layer.

Figure 6A:
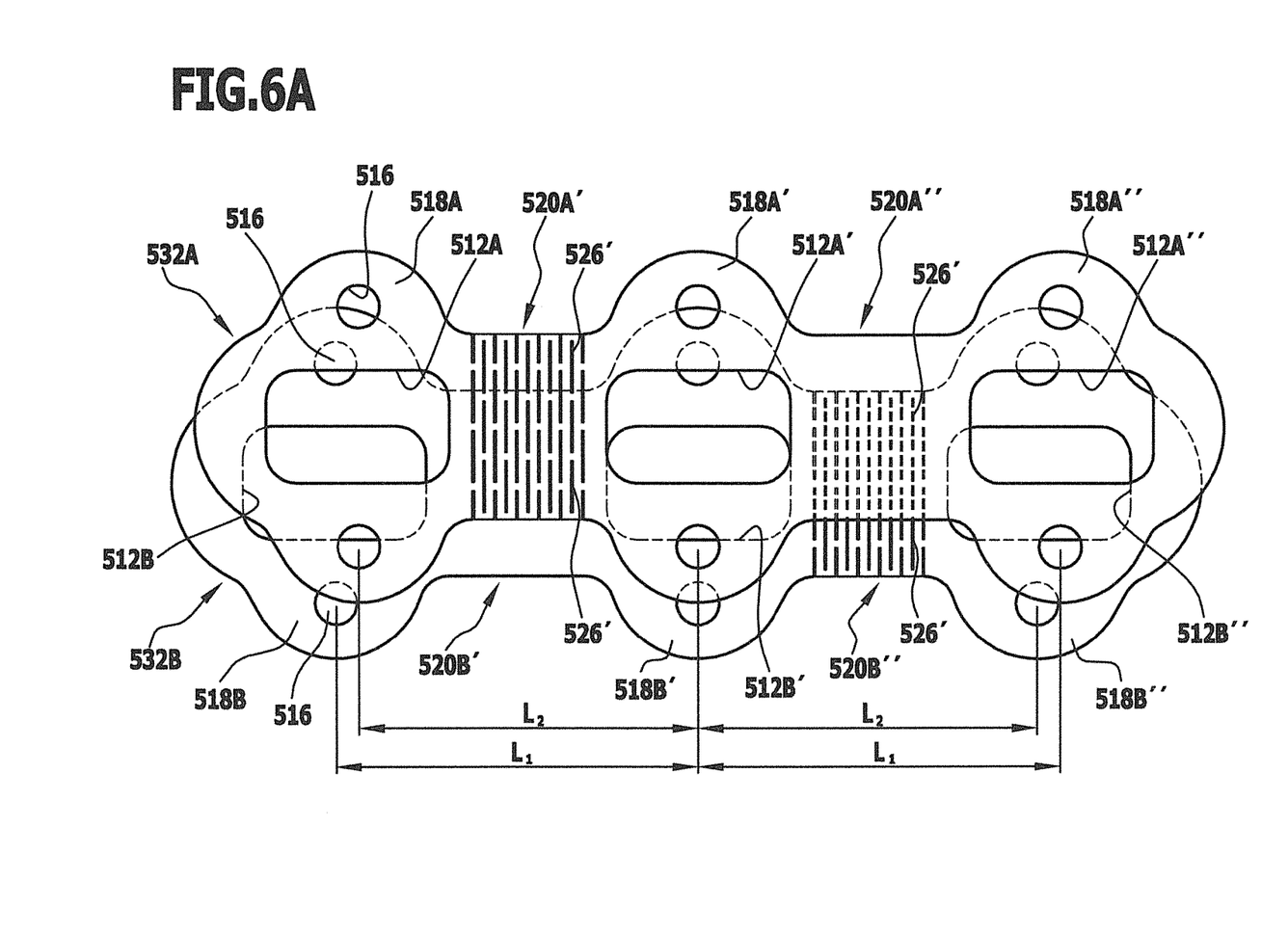
FIG. 6A shows two blanks for seal layers of a sixth embodiment of the invention, wherein the blanks for the seal layers arranged, in the finished flat seal, at least essentially congruently over one another are shown in FIG. 6 displaced relative to one another.

FIG. 6 shows two blanks according to a further embodiment of the invention for two flat seal layers which are arranged at least substantially congruently one over the other in the finished flat seal, whereas in FIG. 6, an upper blank 532A for one seal layer and a lower blank 532B for the other seal layer are shown somewhat displaced relative to one another.

The upper blank 532A has three first layer regions 518A, 518A' and 518A", which are connected to one another by means of second layer regions 520A' and 520A". Each of the first layer regions 518A, 518A' and 518A" has a respective gas through opening 512A or 512A' or 512A" and screw holes 516.

Since the two blanks 532A and 532B are to be configured identically except for a difference still to be described, in FIG. 6 only the first layer regions of the blank 532A have been denoted as 518A, 518A' and 518A" and its second layer regions have been denoted as 520A' and 520A" and the corresponding layer regions of the blank 532A have been denoted as 518B, 518B' and 518B" or 520B' and 520B".

The embodiment shown in FIG. 6 is distinguished in that only the second layer region 520A' of the blank 521A and only the second layer region 520B" of the blank 532B have been provided with stamping cuts 526', so that during manufacturing of the two seal layers from the blanks 532A and 532B, only the second layer region 520A' of the blank 532A and only the second layer region 520B" of the blank 532B are stretched, specifically in the horizontal direction according to FIG. 6.

So that firstly the gas through openings 512A and 512B on one side and secondly the gas through openings 512A" and 512B" lie congruently over one another in the installation-ready flat seal, the second layer region 520A" which is not to be stretched of the blank 532A has a greater length (measured in the horizontal direction according to FIG. 6A) than the stretchable second layer region 520A' which, during the manufacturing of the installation-ready seal layer from the blank 532A is stretched by such an amount (again in the horizontal direction according to FIG. 6A) that the second layer region of the finished seal layer thereby formed from the layer region 520A' has the same length as the second layer region 520A" of the blank 532A. A similar principle applies for the other blank 532B and its second layer regions 520B" and 520B'.

The above-mentioned dimensional proportions have been illustrated in FIG. 6A with the lengths $L_1$ and $L_2$ which denote the separations of the screw holes 516 of the two blanks 532A and 532B on both sides of the second layer regions of the two blanks, where $L_1$ is greater than $L_2$.

Figure 6B:
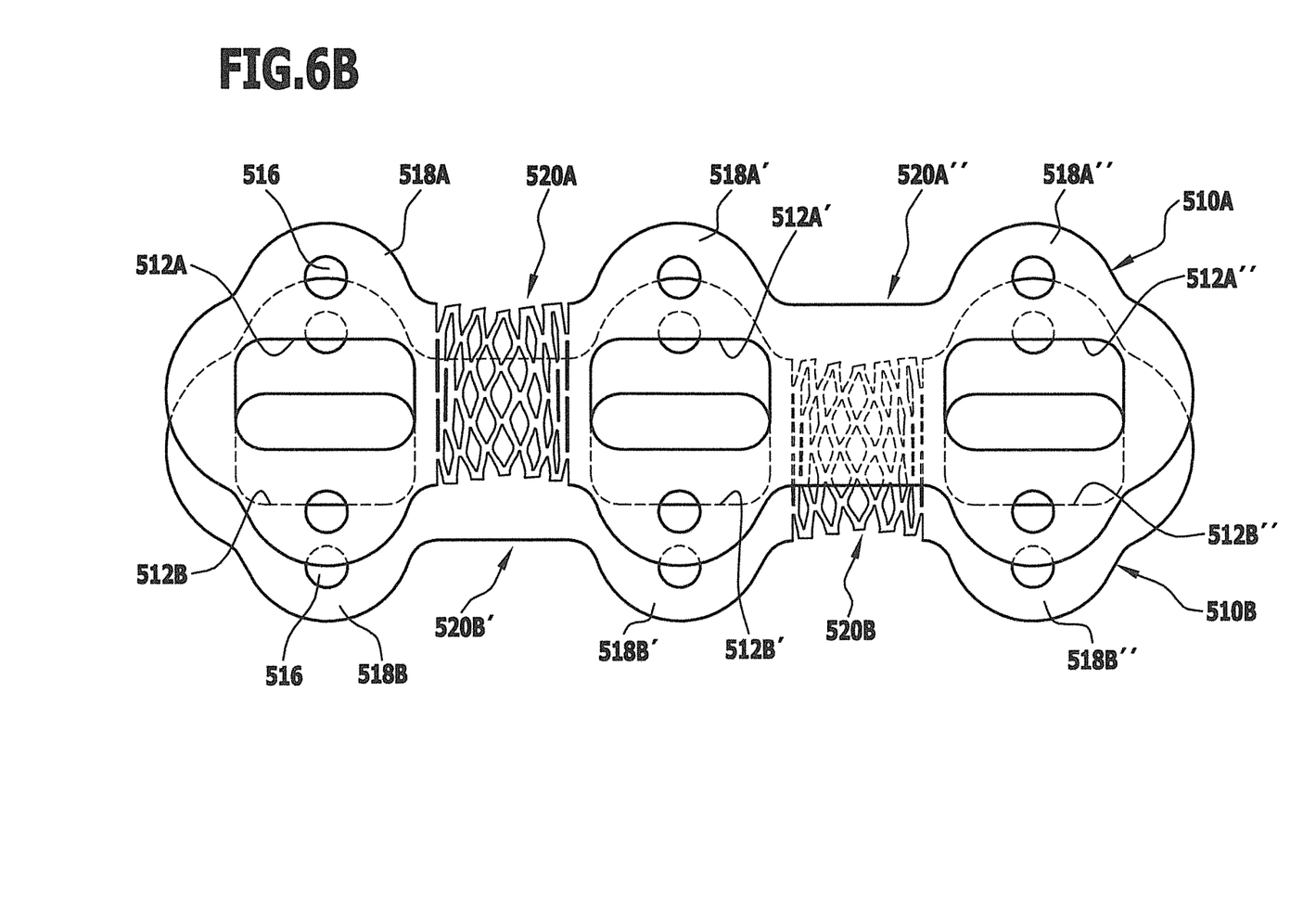
FIG. 6B shows the seal layers manufactured from the two blanks in a representation corresponding to FIG. 6A.

For the representation of the seal layers obtained from the two blanks 532A and 532B and denoted in FIG. 6B as 510A and 510B, the same reference signs have been used in FIG. 6B as in FIG. 6A for the those elements of the two seal layers which remain unaltered during stretching of the two blanks. By means of the stretching of the two blanks 532A and 532B, however, from the two layer regions 520A' and 520B" of the two blanks, the second layer regions 520A and 520B of the seal layers 510A and 510B are obtained.

An aspect of using the present invention on a multiple-layer flat seal follows from FIGS. 6A and 6B, according to which a plurality of seal layers configured according to an embodiment of the invention or their blanks each have a plurality of second layer regions which are not all stretched or stretchable, wherein a stretched second layer region of one seal layer lies over a non-stretched second layer region of another seal layer (with seal layers stacked on one another), which leads to an improvement in the stiffness of the layer stack or the flat seal. However, with such an embodiment, it is also achieved that significantly less material is needed for the manufacturing of the seal layer or the seal layers with at least one stretched second layer region, specifically for the manufacturing of the blank used for such a seal layer.

Figure 7:
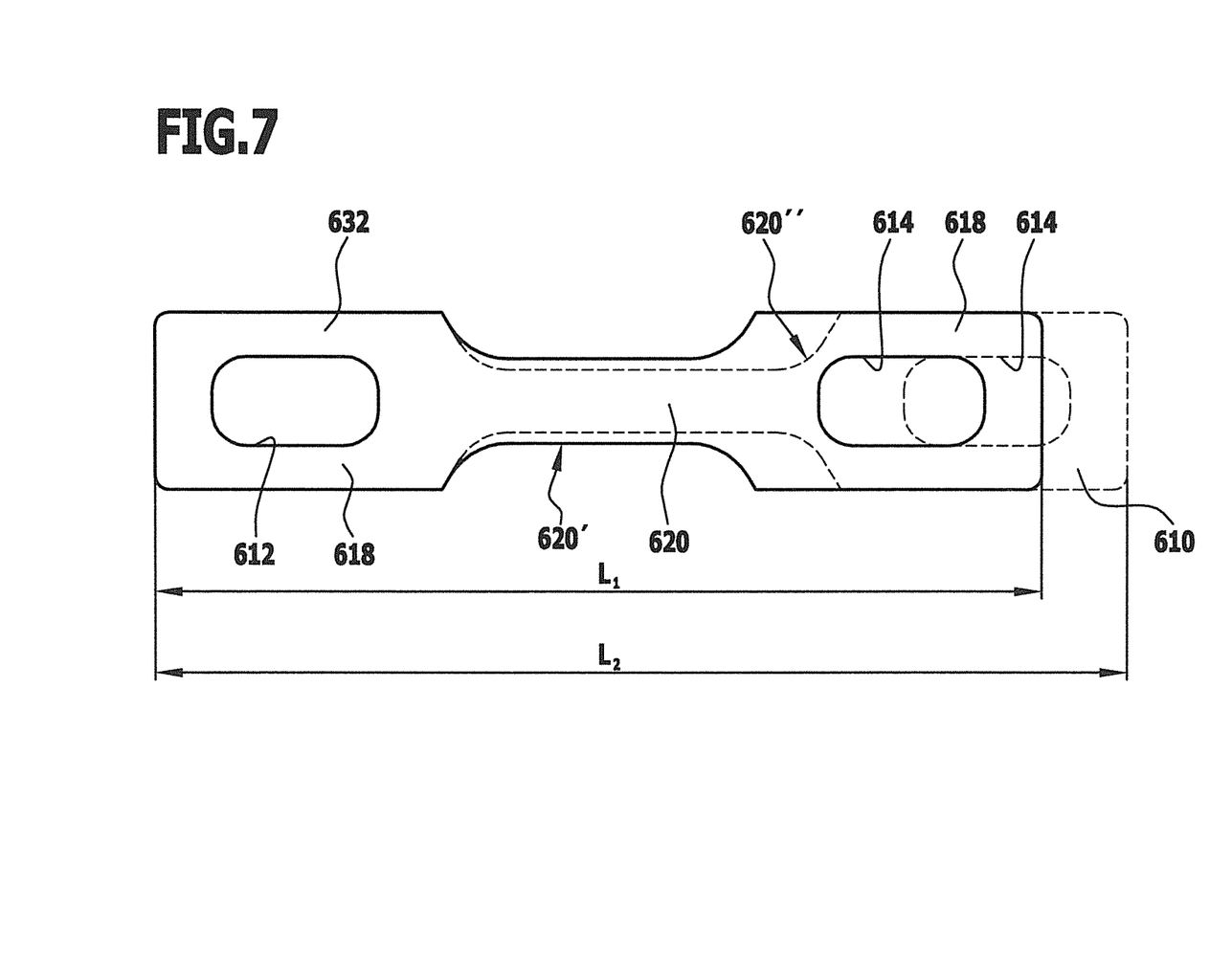
FIG. 7 shows a seventh embodiment of the invention.

Finally, FIG. 7 shows a further embodiment of the invention, specifically with solid lines, a blank 632 for a flat seal layer 610 which, where it does not coincide in its contours with the blank 632, has been represented with dashed lines.

The blank 632 has two first layer regions 618, each having a gas through opening 612 or 614 and, connecting these two first layer regions to one another, a second layer region 620' which is narrowed relative to the first layer regions 618, specifically in the preferred embodiment shown, in that the second layer region 620' has a smaller mean width than the first layer regions 618, so that the second layer region 620' can be stretched with relatively small forces in the horizontal direction according to FIG. 7.

On stretching of the second layer region 620', a constriction 620" forms therein, that is, a reduction of the mean width of this layer region and simultaneously an increase in its length so that the flat seal layer 610 obtained by the stretching has a length $L_2$ which is greater than the length $L_1$ of the blank 632. The stretching of the blank 632 is carried out herein so that the contours of the first layer regions 618 are retained at least substantially unchanged.

As aforementioned, it is to be considered as within the scope of the present invention that medium through openings and other openings and holes of a flat seal layer according to the invention are generated only after the stretching of the blank, that is, in particular are stamped out, and the same applies, for example, to the impressing into the sheet-metal layer, particularly, of sealing beads surrounding the medium through openings. Finally, it is also to be considered as within the scope of the present invention that, following the stretching of the blank, the contours of the flat seal layer are still further processed, particularly with a further stamping process.

In a multiple-layer flat seal according to the invention, different and particularly differently expensive metals may be used; this applies particularly for an exhaust manifold seal to be installed between a cylinder head and an exhaust manifold of an internal combustion engine, wherein it can be advisable, for a seal layer facing an exhaust manifold having higher operating temperatures, to use a steel which is resistant to higher temperatures, and is therefore more expensive, than for a seal layer facing toward the cylinder head. In this case, it can be advisable to use the present invention only for the seal layer facing toward the hotter engine component.

The invention claimed is:

1. A flat seal having at least one single-piece sheet-metal seal layer defining a layer plane, which has at least one first layer region provided with at least one medium through opening and, seen in a plan view of the sheet-metal layer, outside the first layer region, at least one second layer region and with the flat seal installation-ready, has a pre-determined outer contour, wherein the flat seal for the medium through opening has a medium-sealing device which is associated with said medium through opening, characterized in that, at least one sub-region of the second layer region of the installation-ready flat seal lying, when seen in a plan view of the seal layer, outside the medium-sealing device is formed by a stretched sheet-metal region of the sheet-metal layer that is stretched in the layer plane to achieve the pre-determined outer contour such that the installation-ready flat seal comprises the stretched sheet-metal region prior to installation of the flat seal.

2. The flat seal according to claim 1, characterized in that the stretched sub-region is formed at least locally by plastically deformed zones of the metal sheet.

3. The flat seal according to claim 1, characterized in that the stretched sub-region, seen in a plan view of the seal layer, has at least one cut-out between sheet-metal webs extending inclined to one another.

4. The flat seal according to claim 3, characterized in that the sheet-metal layer has a plurality of first layer regions and at least two mutually adjacent first layer regions are connected to one another by means of at least one second layer region, the sheet-metal webs of said second layer region extending inclined to the direction of a straight line which connects the first layer regions to one another.

5. The flat seal according to claim 3, characterized in that, seen in a plan view of the sheet-metal layer, the second layer region forms a projection extending outwardly beyond the remaining sheet metal layer, and that the sheet-metal webs form an angle to the direction in which the projection basically extends beyond the remaining sheet-metal layer.

6. The flat seal according to claim 3, characterized in that the sub-region is formed by an expanded metal region of the sheet-metal layer.

7. A blank of a single-piece sheet-metal layer adapted for forming an installation-ready flat seal, the sheet-metal layer of the installation-ready flat seal having a pre-determined outer contour, wherein the blank defines a layer plane and has a preliminary outer contour, wherein the blank has at least one first layer region provided with at least one medium through opening and, seen in a plan view of the blank, outside the first layer region has at least one second layer region, wherein the preliminary outer contour is smaller in a first direction leading from the first to the second layer region than the pre-determined outer contour, and wherein the sheet-metal layer consists of a metallic material which is deformable in the layer plane and, in at least one sub-region of the second layer region, is configured so that said sub-region is stretchable by a tensile loading in the layer plane and in the first direction to thereby enlarge the preliminary outer contour of the blank in the first direction up to the pre-determined outer contour of the sheet-metal layer of the installation-ready flat seal, the pre-determined outer contour of the installation-ready flat seal being the outer contour of the installation-ready flat seal at the time of installation of the flat seal.

8. The blank according to claim 7, characterized in that the sub-region of the second layer region has a plurality of perforations which, seen in a plan view of the sheet-metal layer, are configured, oriented and arranged so that the perforations are expandable by means of a tensile loading of the blank in the layer plane and in a direction leading from the first to the second layer region and thereby the preliminary outer contour of the blank is enlargeable in the direction of the tensile loading in a pre-determinable manner.

9. The blank according to claim 8, characterized in that at least a plurality of the perforations are formed by linear stamping cuts.

10. The blank according to claim 8, characterized in that at least one of the perforations is formed by a cut-out extending through the sheet-metal layer.

11. The blank according to claim 8, characterized in that the perforations are configured elongate and extend substantially transversely to the direction of the pre-determined enlargement of the outer contour of the blank.

12. The blank according to claim 11, characterized by a plurality of groups of elongate perforations, wherein each group has a plurality of the perforations arranged one behind the other in the longitudinal direction of the perforations and the perforations of each group are offset in the longitudinal direction of the perforations relative to the perforations of an adjacent group.

13. The blank according to claim 8, characterized by a plurality of first layer regions, of which at least two mutually adjacent first layer regions are connected to one another by means of at least one second layer region, the perforations of said second layer region being configured elongate and extending transversely to a straight line which connects the mutually adjacent first layer regions to one another.

14. The blank according to claim 8, characterized in that, seen in a plan view of the blank, the blank comprises:
- a generally elongated form defining a longitudinal direction; and
- a projection formed by said second layer region;
  - wherein said projection extends generally in a projection direction beyond the remaining blank and the elongate formed perforations extend transversely to the projection direction.

15. A method for manufacturing a single-piece sheet-metal flat seal layer of an installation-ready flat seal, said flat seal layer, in the installation-ready flat seal, having a pre-determined final outer contour, at least one first layer region provided with at least one medium through opening and, seen in a plan view of the seal layer, outside the first layer region, at least one second layer region, the method comprising:

cutting, from a metal sheet, a seal layer blank with a preliminary outer contour, said blank defining a layer plane and said preliminary outer contour being smaller in at least a first direction lying in the layer plane than the pre-determined final outer contour of the flat seal layer, wherein the seal layer blank has at least one first blank region corresponding to the at least one first layer region and at least one second blank region for forming the at lest one second layer region, and stretching at least one sub-region of the second blank region by means of a tensile loading of the blank applied in the first direction, thereby transforming the preliminary outer contour at least substantially into the pre-determined final outer contour of the flat seal layer of the installation-ready flat seal, the pre-determined final outer contour of the installation-ready flat seal being the outer contour of the installation-ready flat seal at the time of installation of the flat seal.

16. The method according to claim 15, characterized in that in the sub-region of the second layer region, a plurality of perforations are produced which, seen in a plan view of the blank, are configured, oriented and arranged so that, by means of the tensile loading of the blank, the perforations are expandable in the first direction and in that the sub-region is stretched by means of the tensile loading and is thereby deformed so that in this way the perforations are expanded in the first direction and the preliminary outer contour is transformed at least substantially into the final outer contour.

17. The method according to claim 16, characterized in that the stretched sub-region is pressed flat.

* * * * *